Patented Jan. 24, 1928.

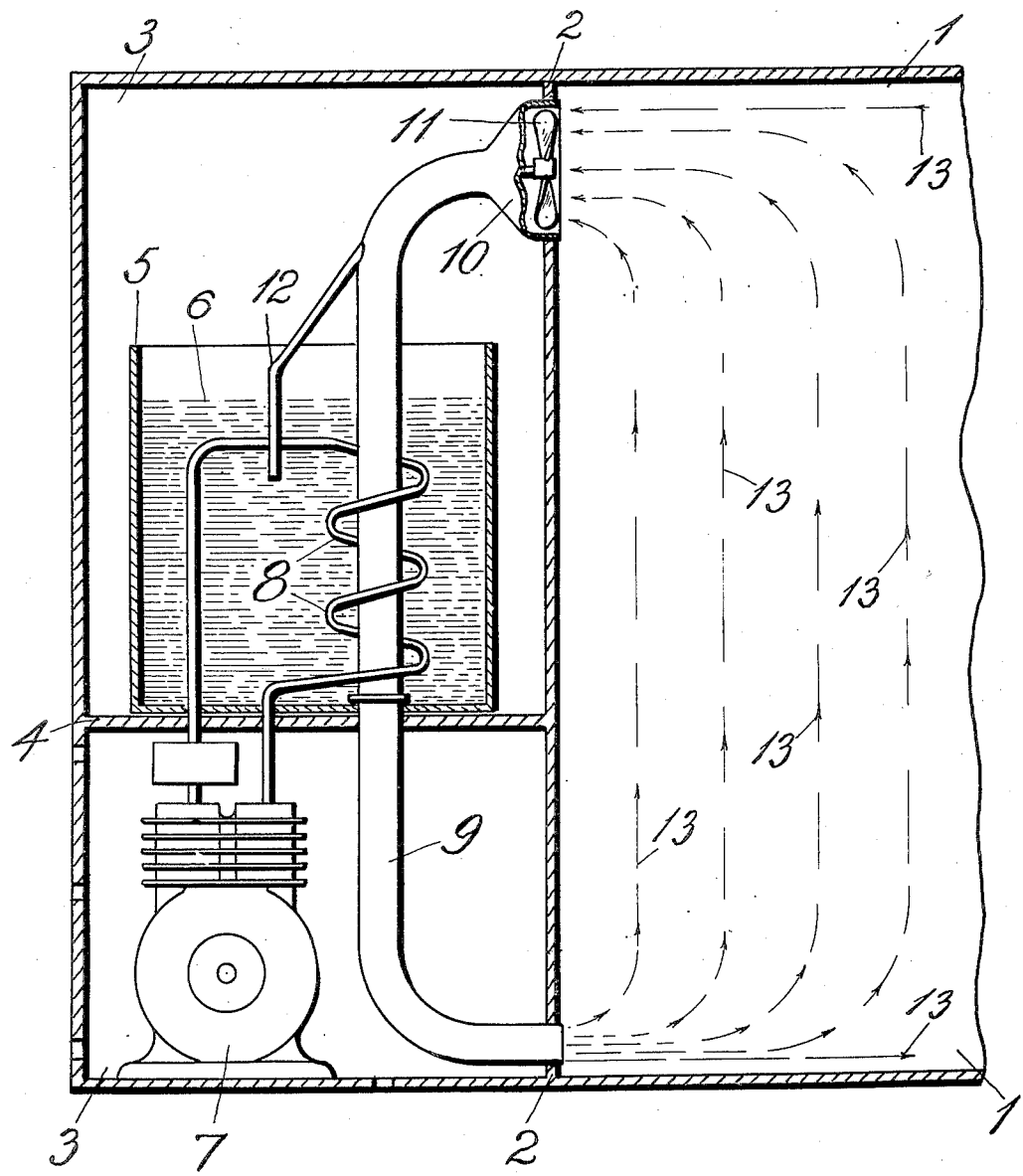

1,657,447

UNITED STATES PATENT OFFICE.

THEODORE LINDSETH, OF ASTORIA, OREGON.

COOLING AND FREEZING APPARATUS.

Application filed December 7, 1926. Serial No. 153,077.

My invention relates to an apparatus and a method in cooling and freezing in which the air from the top of a cooling chamber is drawn into a pipe at the outside of the chamber, subjected to a cooling process and then returned to the said cooling chamber as near the floor thereof as possible.

The objects of my invention are to eliminate the use of ice; to produce quickly a uniform temperature throughout the cooling chamber; and to provide an apparatus whereby the air in the cooling chamber can be held at any predetermined temperature either above or below the freezing point.

Other objects and advantages are to be found in the construction and arrangement of parts as will be described in the specification and particularly pointed out in the appended claim.

I attain these objects with the mechanism illustrated in the accompanying drawing which represents a section through a cooling chamber with the cooling apparatus disclosed in elevation.

Similar numerals in drawing and specification refer to similar parts.

Separated from the cooling chamber 1 by a wall 2 is a small open chamber 3 having a platform 4. On this platform is a tank 5 filled with brine 6, and under the platform is a suitable electrically driven compressor and condenser 7. The evaporator coil 8 from the compressor and condenser enters the brine 6 in the tank 5 and surrounds a tube 9 whose upper and lower ends communicate with the cooling chamber 1. The upper end 10 of the tube is funnel-shaped to accommodate an electrically driven fan 11. To agitate the brine 6 and prevent the same from congealing under extremely low temperatures the pipe 12 branches off the tube 9 and sends a current of air into the brine 6. The circulation of air is indicated by the dotted lines 13 in the cooling chamber 1. A thermostat to keep the air at a desired temperature may be employed if desired.

By this method the cold air penetrates quickly all animal or vegetable matter, warm air pockets are eliminated, and the warm air at the top of the cooling chamber is continually replaced by cold air from the bottom of the chamber.

Having thus described my invention it will be seen that my objects have been accomplished and though I have shown the preferred form of construction I reserve to myself the right to make minor changes, providing I do not violate the spirit and principle of my invention.

I claim:

In combination, a cooling chamber, a chamber adjacent to the cooling chamber, a platform in the adjacent chamber, a brine tank on said platform, a compressor and condenser in the adjacent chamber below said platform, an evaporator coil within said brine tank and communicating with said condenser and compressor, a conduit extending through said brine tank and surrounded by said evaporator coil, said conduit communicating with the upper and lower ends of said cooling chamber, a pipe branching from said conduit into said brine tank, and a fan positioned in the upper end of said conduit for circulating air from the cooling chamber through said conduit and said branch pipe.

In testimony whereof I affix my signature.

THEODORE LINDSETH.